United States Patent
Yuan et al.

(10) Patent No.: US 10,485,165 B2
(45) Date of Patent: Nov. 26, 2019

(54) GRASS TRIMMER

(71) Applicant: CHERVON INTELLECTUAL PROPERTY LIMITED, Road Town (VG)

(72) Inventors: Feng Yuan, Nanjing (CN); Ming Peng, Nanjing (CN); Jianpeng Guo, Nanjing (CN); Zichun Tang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 583 days.

(21) Appl. No.: 14/945,965

(22) Filed: Nov. 19, 2015

(65) Prior Publication Data
US 2016/0143219 A1    May 26, 2016

(30) Foreign Application Priority Data

Nov. 25, 2014    (CN) ............................ 2014 1 0687262
Nov. 25, 2014    (CN) ............................ 2014 1 0687940
Nov. 25, 2014    (CN) ............................ 2014 1 0688084

(51) Int. Cl.
*A01D 34/416*    (2006.01)
*B25F 5/00*    (2006.01)
*A01D 34/81*    (2006.01)

(52) U.S. Cl.
CPC .......... *A01D 34/4165* (2013.01); *B25F 5/008* (2013.01); *A01D 34/81* (2013.01)

(58) Field of Classification Search
CPC ... B25F 5/008; A01D 34/416; A01D 34/4165; A01D 34/736; A01D 34/81; A01D 34/826; A01D 34/828
See application file for complete search history.

(56) References Cited

U.S. PATENT DOCUMENTS

| | | | | |
|---|---|---|---|---|
| 4,052,789 A | * | 10/1977 | Ballas, Sr. ........... | A01D 34/416 30/276 |
| 4,236,309 A | * | 12/1980 | Cayou ................ | A01D 34/4163 30/276 |
| 4,338,719 A | * | 7/1982 | Burkholder .......... | A01D 34/416 30/276 |
| 4,419,822 A | * | 12/1983 | Harris ................ | A01D 34/4163 30/276 |
| 4,490,910 A | * | 1/1985 | Mattson .............. | A01D 34/416 30/276 |
| 5,544,417 A | * | 8/1996 | Atos .................. | A01D 34/4165 30/276 |

(Continued)

OTHER PUBLICATIONS

CIPO, Office Action issued on Canadian patent application No. 2,913,169, dated Aug. 14, 2018, 6 pages.

*Primary Examiner* — Jason Daniel Prone
*Assistant Examiner* — Samuel A Davies
(74) *Attorney, Agent, or Firm* — Greenberg Traurig, LLP

(57) ABSTRACT

A grass trimmer includes a cutting head for mounting a cutting member, a drive head having a output shaft for driving the cutting head to rotate, and an anti-winding member for preventing the output shaft from being wound to by grass. The drive head includes a drive device to drive the output shaft and a head housing for accommodating the drive device. The output shaft connects to the cutting head and passes through the anti-winding member and the anti-winding member is mounted to the cutting head so as to rotate with the cutting head and is disposed between the cutting head and the head housing so as to fill the space between the cutting head and the head housing.

17 Claims, 11 Drawing Sheets

(56) References Cited

U.S. PATENT DOCUMENTS

| | | | | |
|---|---|---|---|---|
| 5,987,756 | A * | 11/1999 | Yates | A01D 34/416 |
| | | | | 30/276 |
| 6,014,812 | A * | 1/2000 | Webster | A01D 34/4163 |
| | | | | 30/276 |
| 6,023,847 | A | 2/2000 | Niedl | |
| 7,111,403 | B2 * | 9/2006 | Moore | A01D 34/4166 |
| | | | | 30/276 |
| 8,918,999 | B2 | 12/2014 | Proulx et al. | |
| 2003/0208996 | A1 * | 11/2003 | Bayer | A01D 34/828 |
| | | | | 55/320 |
| 2008/0196255 | A1 * | 8/2008 | Strader | A01D 34/733 |
| | | | | 30/276 |
| 2009/0245958 | A1 * | 10/2009 | Lau | B25F 5/008 |
| | | | | 408/125 |
| 2010/0101201 | A1 * | 4/2010 | Yanke | A01D 34/733 |
| | | | | 56/295 |
| 2011/0241457 | A1 * | 10/2011 | Muller | A01D 34/902 |
| | | | | 310/50 |
| 2011/0302791 | A1 * | 12/2011 | Proulx | A01D 34/4165 |
| | | | | 30/287 |
| 2013/0283752 | A1 * | 10/2013 | Lister | A01D 34/4165 |
| | | | | 56/295 |
| 2014/0150267 | A1 * | 6/2014 | Sowell | A01D 34/4166 |
| | | | | 30/123 |
| 2014/0360026 | A1 * | 12/2014 | Yamaoka | A01D 34/4163 |
| | | | | 30/276 |
| 2015/0013172 | A1 * | 1/2015 | Shaffer | H02K 5/08 |
| | | | | 30/276 |
| 2015/0359174 | A1 * | 12/2015 | Ito | A01D 34/78 |
| | | | | 56/16.9 |
| 2017/0079204 | A1 * | 3/2017 | Yamaoka | A01D 34/4165 |

* cited by examiner

GRASS TRIMMER

RELATED APPLICATION INFORMATION

This application claims the benefit of Chinese Patent Application No. CN 201410688084.2, filed on Nov. 25, 2014, Chinese Patent Application No. CN 201410687940.2, filed on Nov. 25, 2014, and Chinese Patent Application No. CN 201410687262.X, filed on Nov. 25, 2014, all of which are incorporated herein by reference in their entirety.

FIELD OF THE DISCLOSURE

The present disclosure relates generally to garden tools and, more particularly, to a grass trimmer.

BACKGROUND OF THE DISCLOSURE

Grass trimmers are power tools in the garden tool field, which are used to trim the lawn or remove the weeds by cutting the weeds.

Currently known grass trimmers include a power assembly, such as a motor or an engine, and a cutting head, the cutting head is driven by the power assembly to rotate, such that a cutting member mounted to the cutting head is driven to rotate and cut the weeds.

However, during the operation of the currently known grass trimmer, the fragments of the weeds or other debris may rotate with the cutting head and wind onto an output shaft of the power assembly. As a result, the cutting operation is obstructed.

The statements in this section merely provide background information related to the present disclosure and may not constitute prior art.

SUMMARY

In one aspect of the disclosure, a grass trimmer includes a cutting head for mounting a cutting member, a drive head having a output shaft for driving the cutting head to rotate, a power source device for providing power to the drive head, a handle device configured to be operated by a user, a connector for connecting the drive head and the power source device, and an anti-winding member for preventing the output shaft from being wound to by grass or the like. The drive head includes a motor for driving the output shaft and a head housing for accommodating the motor. The cutting head forms a mounting hole and has a top end which is contacted with the anti-winding member. The handle device is disposed between the drive head and the power source device. The anti-winding member forms a centre hole for being passed through by the output shaft which is insert into the mounting hole. The anti-winding member is mounted to the cutting head so as to rotate with the cutting head and is disposed between the cutting head and the head housing so as to fill the space between the cutting head and the head housing.

In another aspect of the disclosure, a grass trimmer mainly includes a cutting head for mounting a cutting member, a drive head having a output shaft for driving the cutting head to rotate, a power source device for providing power to the drive head, a handle device configured to be operated by a user, a connector for connecting the drive head and the power source device, and an anti-winding member for preventing the output shaft from being wound to by grass or the like. The cutting head includes a first airflow generating arrangement adapted to generate centrifugal airflow when the cutting head rotates. The cutting head is provided with a mounting hole and has a top end which is contacted with the anti-winding member. The drive head is drivingly coupled to drive the output shaft via coupling components disposed in a head housing. An airflow generating arrangement is used to generate airflow that blows towards the outside of the head housing when the output shaft rotates. The handle device is disposed between the drive head and the power source device. The anti-winding member forms a centre hole for being passed through by the output shaft which is insert into the mounting hole. The anti-winding member is mounted to the cutting head so as to rotate with the cutting head and is disposed between the cutting head and the head housing so as to fill the space between the cutting head and the head housing. The power source device comprise a device housing for accommodating or connecting a battery and a connecting air flue connects the inner space of the head housing to the inner space of the device housing so as to allow air to flow from the inner space of the head housing to the inner space of the device housing while the device housing is provided with an air vent.

In yet another aspect of the disclosure, grass trimmer includes a cutting head for mounting a cutting member, a drive head having a output shaft for driving the cutting head to rotate, and an anti-winding member for preventing the output shaft from being wound to by grass or the like. The drive head is drivingly coupled to the output shaft via coupling a coupling mechanism accommodated in a housing. The output shaft connects to the cutting head and passes through the anti-winding member and the anti-winding member is mounted to the cutting head so as to rotate with the cutting head and is disposed between the cutting head and the housing so as to fill the space between the cutting head and the housing.

Further areas of applicability will become apparent from the description provided herein. It should be understood that the description and specific examples are intended for purposes of illustration only and are not intended to limit the scope of the claims hereinafter presented.

The drawings described herein are for illustrative purposes only and are not intended to limit the scope of the

DETAILED DESCRIPTION

The following descriptions are merely exemplary in nature and in no way are intended to limit the invention claimed, its application, or uses.

Figure 1:
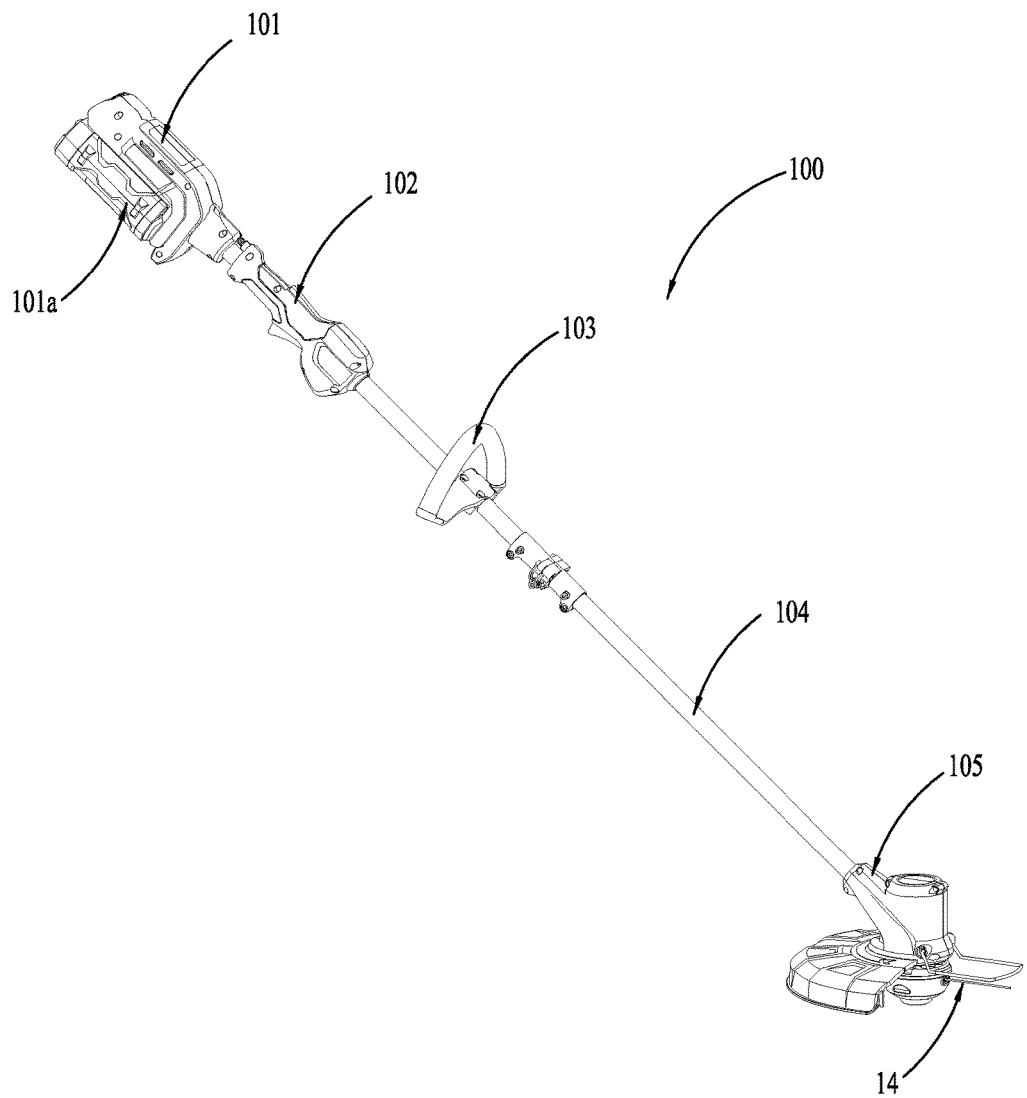
FIG. 1 is a schematic view of an exemplary grass trimmer.

As shown in FIG. 1, a grass trimmer 100 includes a power source device 101, a handle device 102, a front handle 103, a connector 104 and a work device 105.

The power source device 101 is adapted to supply power to the grass trimmer 100, which may be a cordless power supply system having a battery pack 101a or a wired power supply system being able to transmit AC power from an external source to the grass trimmer 100. When the grass trimmer is driven by an engine, the electrical power source maybe omitted.

The handle device 102 is adapted to be operated by a hand of a user so as to control the grass trimmer 100. The front handle 103 is adapted to be grasped by another hand of the user so as to provide a comfortable operating posture. The handle device 102, the front handle 103 and the work device 105 are connected as a whole by the connector 104.

Figure 2:
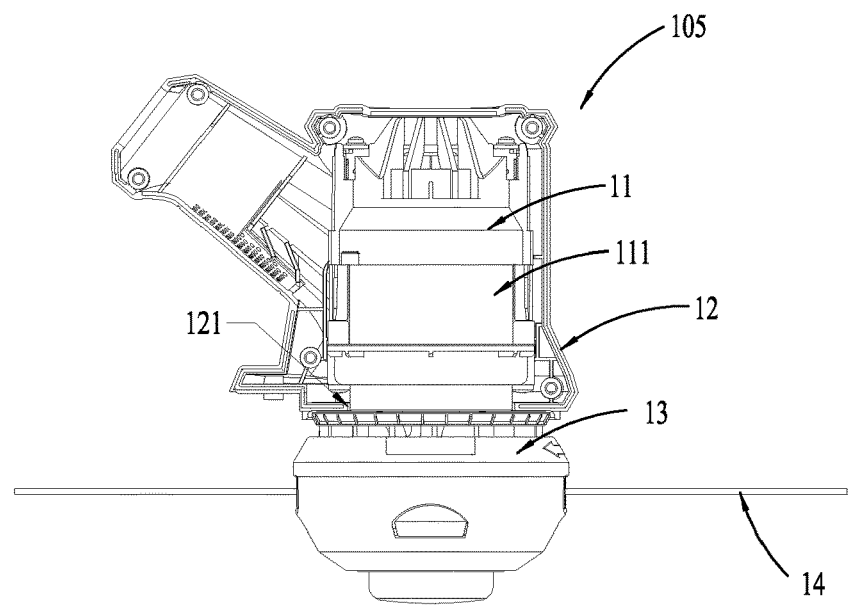
FIG. 2 a part of the schematic view of the grass trimmer of FIG. 1.

The work device 105 is functioned as a main part to cut weeds. As shown in FIG. 2, the work device 105 includes a power assembly 11 and a rotating assembly 13.

Referring to FIGS. 2-7, the power assembly 11 includes a motor 111, a head housing 12 and an output shaft 112.

The motor 111 is able to transform electric power or fuel energy into movement energy, which may be an electrical motor or an engine. The output shaft 112 is able to transmit the movement energy to the rotating assembly 13, so that the rotating assembly 13 is able to rotate about a first axis 200 to cut weeds.

Figure 7:
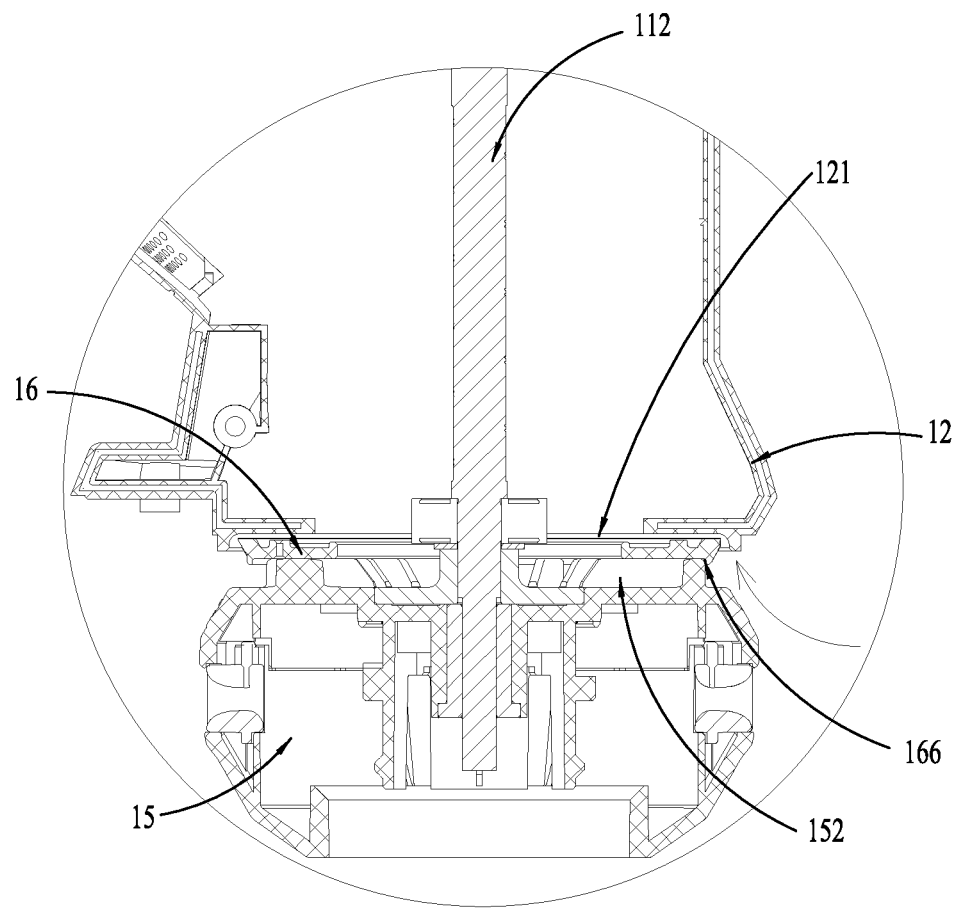
FIG. 7 is a sectional view showing a part of the grass trimmer of FIG. 1, wherein an arrow shows the direction that weeds enter the cutting head.

The output shaft 112 is driven by the motor 111 directly or indirectly. As shown in FIG. 7, the output shaft 112 is extended out of the head housing 12 to connect and drive the rotating assembly 13.

It will be appreciated that the power source device 101 may be provided with a motor, and the work device 105 may include a transmission which is driven by the motor by a long shaft in the connector 104. The output shaft 112 is driven by the transmission directly, the transmission is disposed in the head housing 12 as a driving mechanism.

The head housing 12 is adapted to accommodate the motor 111. And the head housing 12 is provided with an opening 121 which allows the output shaft 112 to extend out of the head housing 12.

Referring to FIGS. 2-6, the rotating assembly 13 includes a cutting member 14, a cutting head 15 and an anti-winding member 16.

The cutting member 14 is adapted to contact and cut the weeds. In the embodiment as shown in FIG. 1, the cutting member 14 is a cutting line. However, the cutting member 14 may be other cutting tools such as a cutting blade.

The cutting head 15 is adapted to mount or accommodate the cutting member 14, and drive the cutting member 14 to rotate. As shown in FIG. 7, when the cutting member 14 is a cutting line, the cutting head 15 is provided with a chamber for accepting the cutting line.

Figure 3:
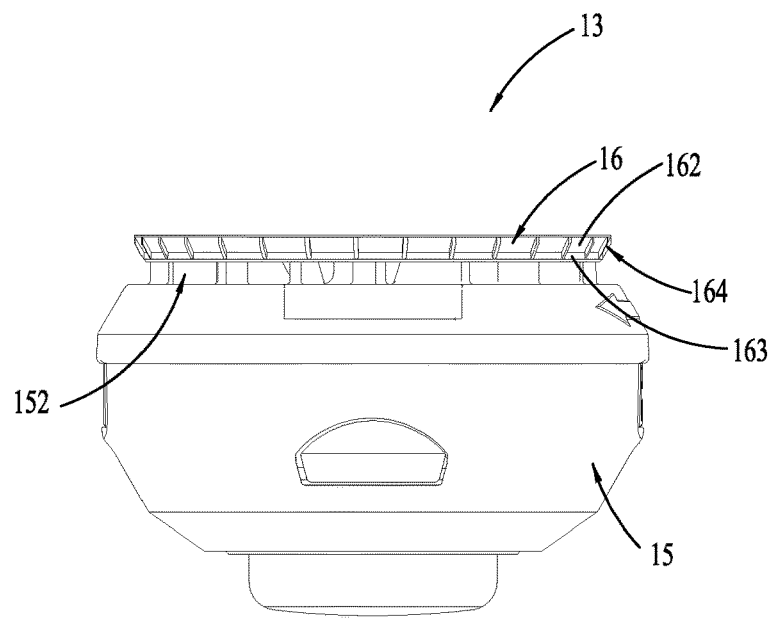
FIG. 3 is a schematic view of a rotating assembly of the grass trimmer of FIG. 2.
Figure 5:
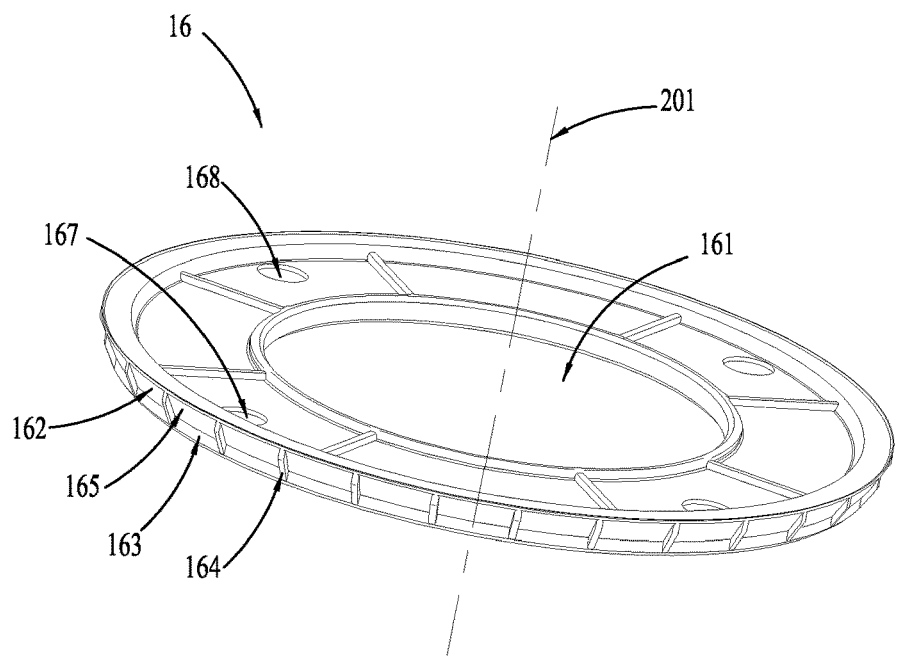
FIG. 5 is a schematic view of an anti-winding member of the grass trimmer of FIG. 4.

The anti-winding member 16 is adapted to protect the output shaft 12 against winding of the weeds there onto. Specifically, the anti-winding member 16 is disposed on a top side of the cutting head 15. When the rotating assembly 13 is assembled to the output shaft 12, the anti-winding member 16 is disposed between the cutting head 15 and the head housing 12 and close to the head housing 12. With the anti-winding member 16, the head housing 12 and the cutting head 15 are engaged more tightly. Firstly, a gap formed between the head housing 12 and the cutting head 15 in the direction of the first axis 200 is filled by the anti-winding member 16. Secondly, the anti-winding member 16 is arranged radially so that the weeds cannot move toward the output shaft 112. Therefore, the anti-winding member 16 can prevent the weeds from winding onto the output shaft 112. Referring to FIGS. 2, 3 and 5, the anti-winding member 16 includes a top end and a bottom end, the top end is bigger than the bottom end in the radial direction of the output shaft 112 so a distance between the periphery of the anti-winding member 16 and the head housing 12 is decreased gradually from the bottom up and along the direction from the bottom to the top of the cutting head 15, which makes it difficult for the weeds to enter into the gap.

The words "top" and "bottom" described in the description can be referred to the orientation of the drawings, which are just used to describe the relative positions, not the absolute positions, and which cannot be used to limit the protecting range of the claims.

The top end of the cutting head 15 is contacted with the anti-winding member 16. The cutting head 15 is provided with a mounting hole 153. An end of the output shaft 112 is inserted into the mounting hole 153. By way of example only, the anti-winding member 16 with an annular shape is provided with an centre hole 161. The output shaft 112 is able to pass through the anti-winding member 16 via the centre hole 161.

Figure 8:
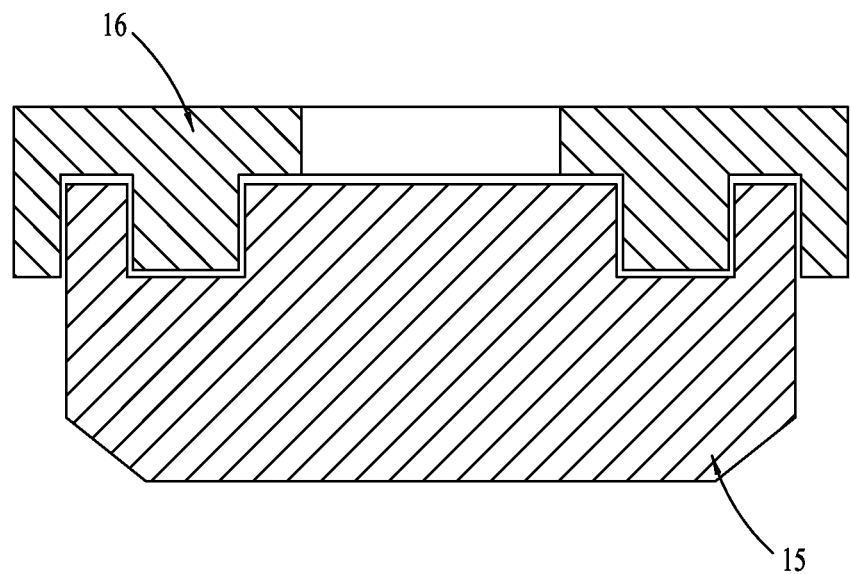
FIG. 8 is a further schematic view of an anti-winding member and the cutting head.
Figure 9:
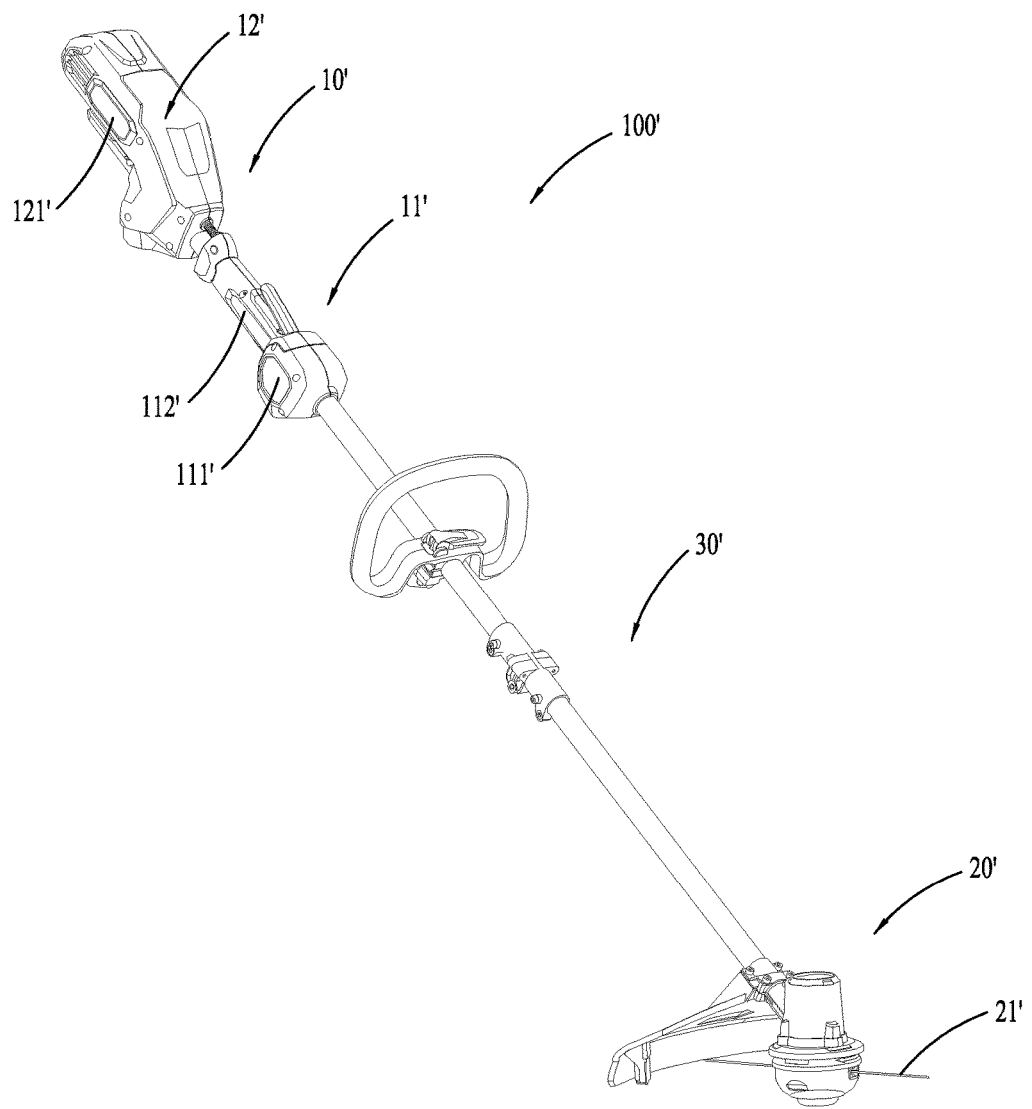
FIG. 9 is a further schematic view of a grass trimmer.

It is also contemplated that the anti-winding member 16 is not contacted with the top end of the cutting head 15. As shown in FIG. 8, one of the anti-winding member 16 and the cutting head 15 is provided with projections, and the other one is provided with recesses for engaging with the projections. A labyrinth structure is formed between the anti-winding member 16 and the cutting head 15. The anti-winding member 16 and the cutting head 15 are partially overlapped in the direction of the first axis 200 so the weeds are prevented from entering into the gap formed between anti-winding member 16 and the cutting head 15 and winding around the output shaft 112. The anti-winding member 16 is rotatably connected to the top end of the cutting head 15. Alternatively, the anti-winding member 16 is mounted to the head housing 12 and placed on the top end of the cutting head 15.

The anti-winding member 16 is connected fixedly and directly to the cutting head 15 so as to form a whole. The whole is mounted to the output shaft 112.

As shown in FIG. 7, the anti-winding member 16 is at least partially accommodated in the head housing 12. Specifically, the anti-winding member 16 is at least partially accommodated in a part of the head housing 12 where the output shaft 112 is extended from.

As shown in FIG. 5, the top end of the anti-winding member 16 is bigger than the bottom end. Specifically, the anti-winding member 16 includes an annular inclined surface 162 and an annular cylindrical surface 163 on the periphery. The annular inclined surface 162 is a side wall of a cone frustum. The annular cylindrical surface 163 is a side wall of a cylindrical. The annular inclined surface 162 and the annular cylindrical surface 163 have the same revolving axis 201 which coincides with the first axis 200 and an axis of the output shaft 112. The annular cylindrical surface 163 is disposed on the bottom of the annular inclined surface 162, which is also disposed on a side of the annular inclined surface 162 away from the head housing 12.

The anti-winding member 16 is provided with an auxiliary airflow generating part 165 on the periphery. When the auxiliary airflow generating part 165 is rotated, it is able to generate airflow. The auxiliary airflow generating part 165 includes ribs or fan blades arranged on the periphery of the anti-winding member 16.

The anti-winding member 16 further includes peripheral ribs 164 on the periphery surface. The peripheral ribs 164 protrude from the annular inclined surface 162. The peripheral ribs 164 are extended in the direction parallel to the annular inclined surface 162 from the annular inclined surface 162 to the annular cylindrical surface 163 and protrude from the annular cylindrical surface 163.

The peripheral ribs 164 are arranged uniformly on the periphery surface of the anti-winding member 16, which is able to generate airflow around the anti-winding member 16 flowing in the direction away from the anti-winding member 16 so as to blow away the weeds.

It is to be understood that the anti-winding member 16 may include other structure to generate airflow.

In the illustrated example, the cutting head 15 includes a main airflow generating part 151 which is able to generate airflow around the cutting head 15 flowing in the direction away from the cutting head 15 when the cutting head 15 is rotated about the first axis 200.

The cutting head 15 includes top ribs 152. The main airflow generating part 151 is formed by the top ribs 152.

The top ribs 152 are provided on the top end of the cutting head 15 and protruded from the cutting head 15 toward the anti-winding member 16. The top ribs 152 are disposed between the cutting head 15 and the anti-winding member 16. Each top rib 152 has a top end which is contacted with the bottom end of the anti-winding member 16.

Figure 6:
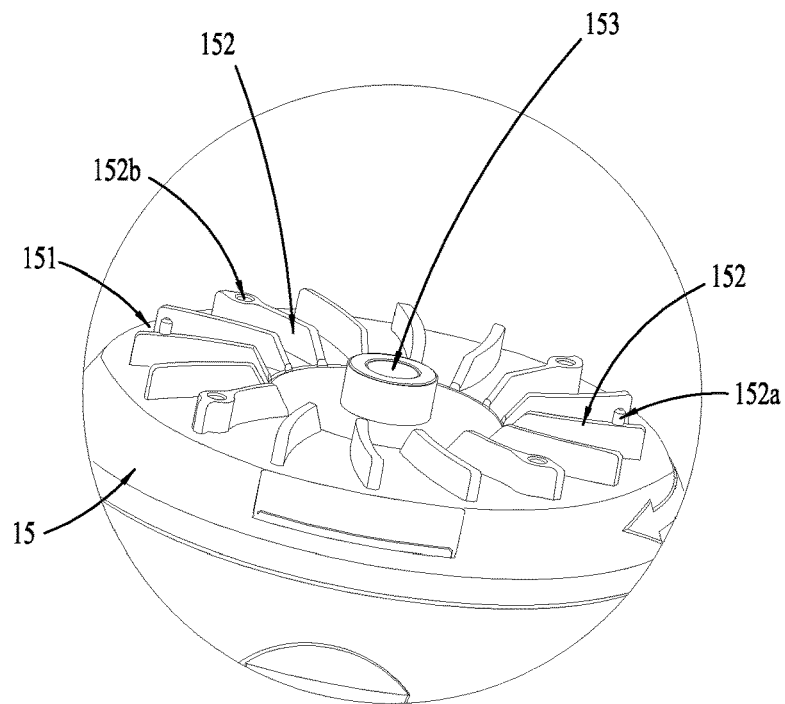
FIG. 6 is an exploded view showing a top end of a cutting head of the grass trimmer.

As shown in FIG. 6, the top ribs 152 in the form of fan blades are able to generate centrifugal airflow around the cutting head 15. When the cutting head 15 is rotated, the airflow flows outward so as to blow away the weeds and debris and cool the motor 111.

The cutting head 15 is provided with a space on its top end for accepting the top ribs 152. The air passage between two adjacent top ribs is long enough so that the airflow generated is strong. While the peripheral ribs 164 on the periphery of the anti-winding member 16 can generate auxiliary airflow which cooperates with the airflow generated by the top ribs 152. Specifically, the airflow generated by the top ribs 152 flows in the radial direction of the output shaft 112 toward the outer periphery of the top ribs 152 while the airflow generated by the peripheral ribs 164 flows in the direction inclined to the output shaft 122 and deviating toward the cutting head 15 so it is difficult for the weeds and debris to enter into the gap between the anti-winding member 16 and the head housing 12.

Figure 4:
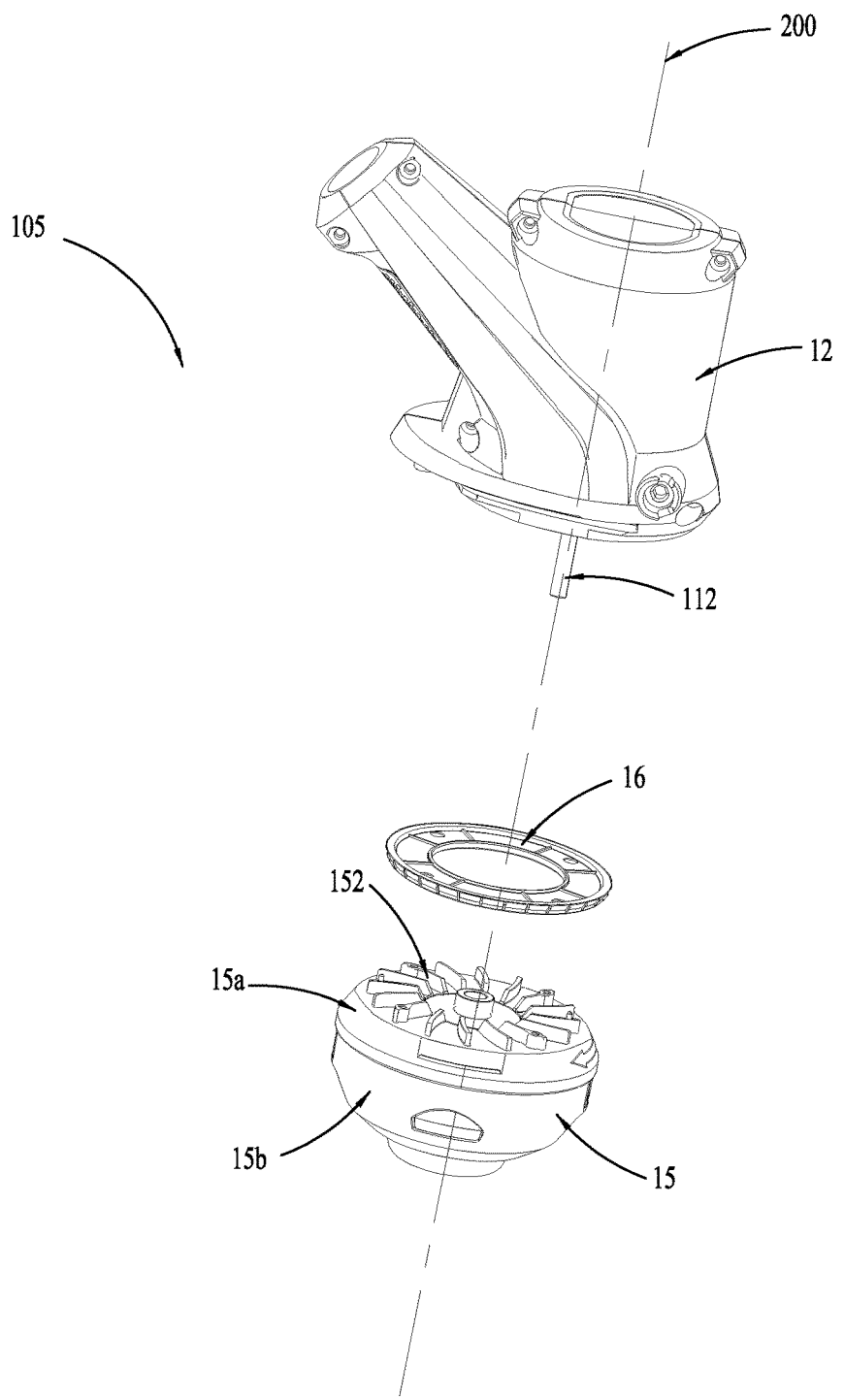
FIG. 4 is an exploded view showing a part of the grass trimmer of FIG. 1.

As shown in FIG. 4, the cutting head 15 includes a first shell 15a and a second shell 15b. The top ribs 152 are disposed on the first shell 15a.

The anti-winding member 16 is provided on its bottom end with a recess 166 for accepting the top ribs 152.

Referring to FIGS. 5-6, some of the top ribs 152 includes a locating lug 152a or a fixing aperture 152b. Correspondingly, the anti-winding member 16 includes locating holes and fixing holes 167, 168. The locating lug 152a is inserted into the locating hole so as to realize the location between the anti-winding member 16 and the cutting head 15. The anti-winding member 16 and the cutting head 15 are assembled by screws passing through the fixing holes 167, 168 and the fixing apertures 152b.

Referring to FIGS. 9-12, a grass trimmer 100' includes a main body 10', a work device 20' and a connector 30'. The connector 30' is adapted to connect the main body 10' and the work device 20'.

The main body 10' includes a handle device 11' and a power source device 12'. The main body 10' is disposed on a back end of the grass trimmer 100'. The power source device 12' is used to supply power to the grass trimmer 100', which includes a device housing 121'. The power source device 12' may be a battery that is detachably connectable to the device housing 121' or may be have battery in the device housing 121'. It is acknowledged that the power source device 12' may be an AC power source adapter. The handle device 11' is adapted to control the work device 20'. The handle device 11' includes an operating handle. The operating handle includes a handle shell 111' and a main switch 112'. The main switch 112' is adapted to be operated by the user to control the grass trimmer 100'.

The work device 20' is disposed on a front end of the grass trimmer 100', which includes a cutting member 21', a cutting head 22', a drive head 23' and an anti-winding member 24'.

Figure 10:
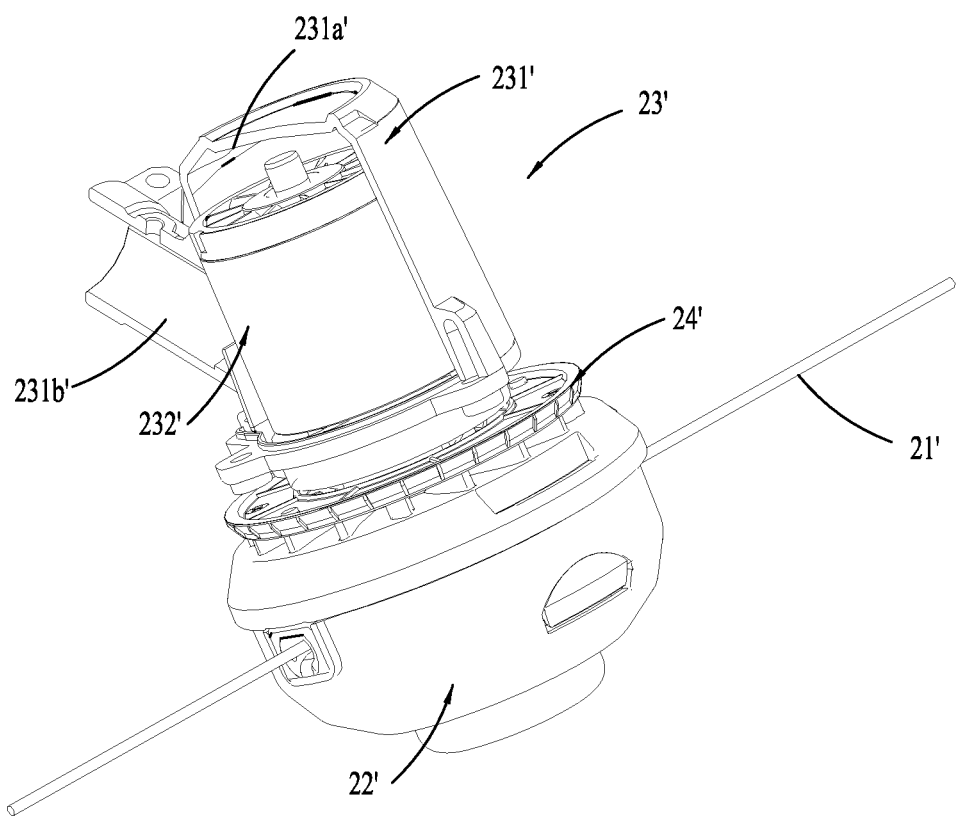
FIG. 10 is a schematic view of the cutting device of FIG. 9, wherein a part of a housing is removed.

The cutting member 21' is used to contact and cut the weeds. As shown in FIG. 10, the cutting member 21' is a cutting line. However, the cutting member 21' also can be other cutting tools such as a cutting blade.

In this embodiment, the cutting head 22' has the same structure as the cutting head 15 as shown in FIGS. 1-7.

As described before, when the cutting head 15 rotates, the top rids 152 generate centrifugal airflow flowing away the cutting head 15. The same structures as the top ribs 152 of the cutting head 22' are defined as first airflow generating device.

Figure 11:
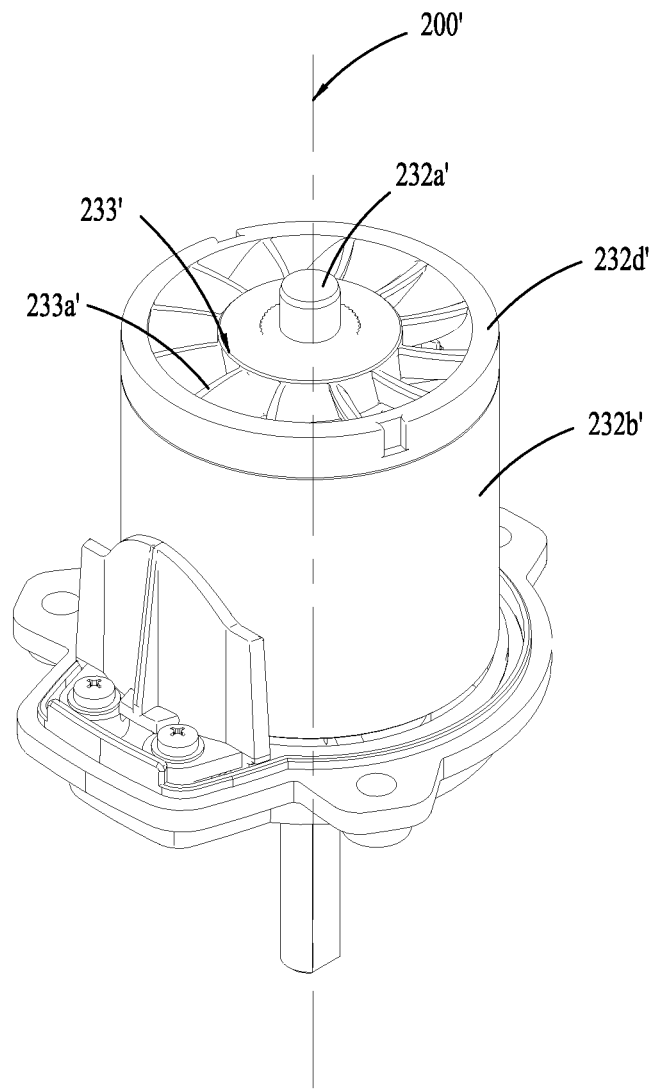
FIG. 11 is a schematic view of a motor of FIG. 10.
Figure 12:
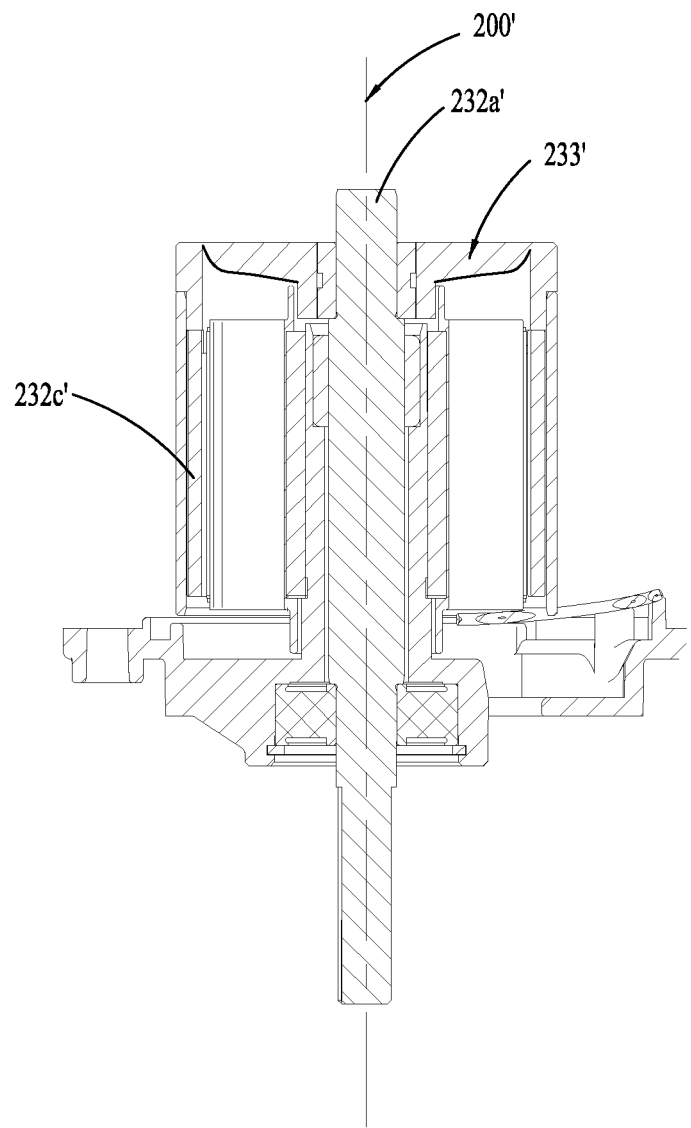
FIG. 12 is a sectional view of the motor of FIG. 11.

Referring to FIGS. 10-12, the drive head 23' is adapted to drive the cutting head 22' to rotate. The drive head 23' includes a head housing 231', a motor 232' and a fan 233'. The motor 232' is an outer rotor motor, which includes a rotor and a stator.

The head housing 231' includes a containing part 231a' and a connecting part 231b'. The containing part 231a' and the connecting part 231b' are integrally formed. The containing part 231a' is formed with a chamber for accepting the stator and rotor. The connecting part 231b' is adapted to connect the work device 20' and the connector 30' mechanically.

The rotor includes a sleeve 232b', magnetic elements 232c' and a cover 232d'. The sleeve 232b' with a hollow cylindrical shape is contained in the chamber of the head housing 231' and is able to rotate relative to the head housing 231'. The magnetic elements 232c' are arranged uniformly on an inside wall of the sleeve 232b'. The cover 232d' is disposed on an end of the sleeve 232b' and rotated with the sleeve 232b'.

The stator is accommodated in the sleeve 232b' and connected with the head housing 231'. The output shaft 232a' is driven to rotate about a first axis 200' by the rotor so as to transmit the torque of the drive head 23' to the cutting head 22'.

The fan 233' is disposed on an end of the sleeve 232b' and may be integrally formed with the cover 232d'. The fan 233' is provided with a hole in the center for engaging with the output shaft 232a' so the fan 233' is driven to rotate by the rotor. The output shaft 232a' is driven to rotate by the fan 233'. The fan 233' includes a second airflow generating part 233a'. When the fan 233' is rotated about the first axis 200', the second airflow generating part 233a' is able to generate airflow blowing along the first axis 200' and toward the cutting head 22'. Alternatively, a part of the airflow generated by the fan 233' is obstructed by some structure, the airflow is partially blown toward the cutting head 22'. The fan 233' is defined as second airflow generating device and the second airflow generating device is capable of generating airflow blowing toward the outside of the head housing 231' when the output shaft 232*a*' rotates.

By way of example, the fan 233' may be an axial fan mounted in the head housing 231'. The fan 233' is able to generate airflow which not only blows away the weeds but also cools the motor 232'.

The anti-winding member 24' is connected fixedly and directly with the cutting head 22'. The anti-winding member 24' and the cutting head 22' are constructed as a whole. The whole is mounted to the output shaft 232*a*'. The cutting head 22' and the anti-winding member 24' are overlapped in the direction of the first axis 200' and the first airflow generating device of the cutting head 22' is located outside the head housing 231' so the airflow generated by the fan 233' and the airflow generated by the first airflow generating device are prevented from blowing to each other.

The anti-winding member 24' has the same structure as the anti-winding member 16 shown in FIGS. 1-7. As described before, when cutting head 15 rotates, the peripheral ribs 164 generate centrifugal airflow flowing away the cutting head 15. The same structures as the peripheral ribs 164 of anti-winding member 24' are defined as a third airflow generating device.

When the third airflow generating device is rotated, it is able to generate airflow around the anti-winding member 24' flowing in the direction away from the anti-winding member 24' and makes the air in the head housing 231' flow outward.

Figure 13:
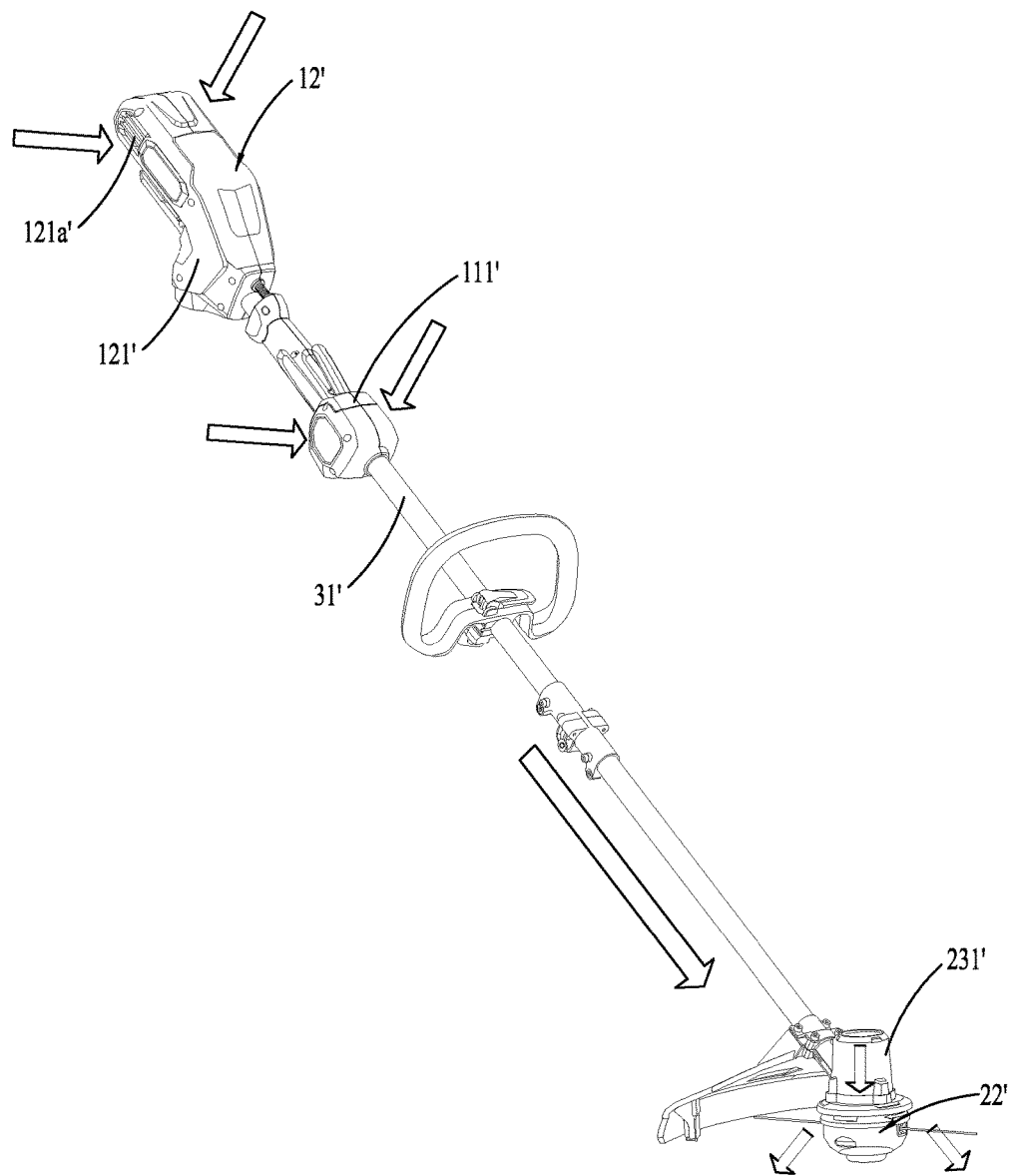
FIG. 13 is a schematic view of the grass trimmer of FIG. 9, wherein the flow direction of the airflow is illustrated.

In order to prevent the winding of weeds and to cool the motor, the connector means 30' includes a hollow tube 31' with a connecting air flue therein. As shown in FIG. 13, an end of the hollow tube 31' is connected with the connecting part 231*b*' of the head housing 231' and the other end of the hollow tube 31' is connected with the power source device 12' so an end of the connecting air flue is communicated with the chamber of the head housing 231' while the other end of the connecting air flue is communicated with the device housing 121'. The device housing 121' is provided with a vent 121*a*' for communicating the inside and outside of the device housing 121'. Therefore, by the first airflow generating device and the second airflow generating device, the airflow can be entered into the device housing 121' from the outside, then through the connecting air flue, and entered into the head housing 231'. Finally the airflow is blown to the outside of the head housing 231' so the weeds close to the cutting head 22' are blown away and the motor 232' is cooled effectively. Otherwise, due to the airflow flowing through the space in the device housing 121', the battery and the circuit in this space are also cooled effectively.

The handle device may include a handle housing 111' for being handle by a user. The connecting air flue connects the inner space of the handle housing 111' to the inner space of the head housing 231'; and handle housing 111' is provided with an air vent so as to let airflow blowing into the handle housing 111' to cool the control device which is disposed in the handle housing 111'.

In order to strengthen the airflow generated by the first airflow generating device and the second airflow generating device and to improve the effect of anti-winding, the connecting flue may further include through holes located on the hollow tube 31'. The through holes make the connecting flue communicate with the outside.

It will also be understood that the anti-winding member 24' can be formed using other structures which are able to flow the air.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A grass trimmer, comprising:
   a cutting head for mounting a cutting member;
   a drive head having an output shaft for driving the cutting head to rotate;
   a power source device for providing power to the drive head;
   a handle device configured to be operated by a user;
   a connector for connecting the drive head and the power source device; and
   an anti-winding member for preventing the output shaft from being wound to by grass or the like being cut by the cutting member;
   wherein the drive head comprises:
   a motor for driving the output shaft; and
   a head housing for accommodating the motor;
   wherein the cutting head forms a mounting hole and has a top end which is contacted with the anti-winding member,
   wherein the handle device is disposed between the drive head and the power source device,
   wherein the anti-winding member forms a centre hole for being passed through by the output shaft which is inserted into the mounting hole and the anti-winding member is mounted to the cutting head so as to rotate with the cutting head and is disposed between the cutting head and the head housing so as to fill the space between the cutting head and the head housing,
   wherein the cutting head comprises a plurality of top ribs disposed on a top end of the cutting head, protruding from the top end of the cutting head, and extending towards the anti-winding member for generating a centrifugal airflow when the cutting head rotates,
   wherein the anti-winding member includes at least two fixing holes and at least two of the plurality of top ribs include a fixing aperture, and
   the grass trimmer further comprises fasteners mounted to the fixing holes and the fixing apertures thereby fixing the anti-winding member to the top ribs.

2. The grass trimmer of claim 1, wherein the anti-winding member comprises a plurality of peripheral ribs protruding radially outward from a peripheral surface of the anti-winding member, when the anti-winding member rotates with the cutting head, both the peripheral ribs and the top ribs generate the centrifugal airflow.

3. The grass trimmer of claim 2, wherein the peripheral ribs are formed along a direction which inclines relative to the output shaft.

4. The grass trimmer of claim 3, wherein the peripheral surface of the anti-winding member comprises an annular inclined surface and at least a portion of the peripheral ribs protrude radially outward from the inclined surface.

5. The grass trimmer of claim 2, wherein the drive head further comprises a fan for blowing airflow to the anti-winding member and the fan is disposed in the head housing and driven by the motor.

6. The grass trimmer of claim 5, wherein the motor comprises a stator connected to the housing and a rotor for rotating with the output shaft relative to the stator wherein the rotor comprises a sleeve for accommodating the stator and the fan is mounted with the sleeve so as to rotate with the sleeve.

7. The grass trimmer of claim 6, wherein the fan is an axial fan which is disposed on an end of the sleeve.

8. A grass trimmer, comprising:
a cutting head for mounting a cutting member;
a drive head having a output shaft for driving the cutting head to rotate; and
an anti-winding member for preventing the output shaft from being wound to by grass or the like being cut via use of the cutting head,
wherein the drive head comprises a drive device for driving the output shaft and a head housing for accommodating the drive device and wherein the drive device is disposed in the head housing,
wherein the output shaft connects to the cutting head and passes through the anti-winding member and the anti-winding member is mounted to the cutting head so as to rotate with the cutting head and is disposed between the cutting head and the head housing so as to fill the space between the cutting head and the head housing,
wherein the cutting head comprises a plurality of top ribs disposed on a top end of the cutting head and extending towards the anti-winding member for generating a centrifugal airflow, and
wherein the anti-winding member comprises at least two fixing holes and at least two of the top ribs include a fixing aperture, and the grass trimmer further comprises fasteners coupling the fixing holes and the fixing apertures to mount the anti-winding member to the top ribs.

9. The grass trimmer of claim 8, wherein the cutting head is provided with a mounting hole and the output shaft inserts in the mounting hole.

10. The grass trimmer of claim 9, wherein the anti-winding member is provided with a centre hole and the output shaft passes through the centre hole.

11. The grass trimmer of claim 8, wherein the cutting head has a top end which is contacted with the anti-winding member.

12. The grass trimmer of claim 11, wherein the anti-winding member comprises a top end and a bottom end and the top end is bigger than the bottom end in the radial direction of the output shaft.

13. The grass trimmer of claim 11, wherein the anti-winding member comprises a plurality of peripheral ribs for generating centrifugal airflow and the peripheral ribs protrude radially outward from a peripheral surface of the anti-winding member.

14. The grass trimmer of claim 11, wherein the plurality of top ribs extend toward the anti-winding member.

15. The grass trimmer of claim 14, wherein the plurality of top ribs have a top end which is contacted with a bottom end of the anti-winding member and the anti-winding member is provided with a recess on the bottom end for accepting the top ribs.

16. The grass trimmer of claim 14, wherein the anti-winding member is at least partially accommodated within the head housing.

17. The grass trimmer of claim 8, wherein the drive device comprises a stator connected to the head housing and a rotor connected to the output shaft and the rotor comprises a sleeve for accommodating the stator.

* * * * *